US010527260B2

(12) United States Patent
Poorter et al.

(10) Patent No.: US 10,527,260 B2
(45) Date of Patent: Jan. 7, 2020

(54) SOCKET ASSEMBLY AND CLAMP FOR A SOCKET ASSEMBLY

(71) Applicant: TE Connectivity Nederland BV, s'Hertogenbosch (NL)

(72) Inventors: Peter Poorter, Wijk en Aalburg (NL); Olaf Leijnse, Asten (NL); Jeroen Iedema, Wolvega (NL); Alessandro Bernadi, Eindhoven (NL)

(73) Assignee: TE Connectivity Nederland BV, s'Hertogenbosch (NL)

( * ) Notice: Subject to any disclaimer, the term of this patent is extended or adjusted under 35 U.S.C. 154(b) by 0 days.

(21) Appl. No.: 15/262,729

(22) Filed: Sep. 12, 2016

(65) Prior Publication Data

US 2016/0377266 A1  Dec. 29, 2016

Related U.S. Application Data

(63) Continuation of application No. PCT/EP2015/055108, filed on Mar. 11, 2015.

(30) Foreign Application Priority Data

Mar. 12, 2014  (EP) ..................... 14159152

(51) Int. Cl.
*F21V 19/00* (2006.01)
*F21V 17/12* (2006.01)
(Continued)

(52) U.S. Cl.
CPC ............ *F21V 19/003* (2013.01); *F21V 17/12* (2013.01); *F21V 17/166* (2013.01);
(Continued)

(58) Field of Classification Search
CPC ...... F21V 19/045; F21V 19/001; F21K 9/232; F21Y 2115/10; Y10T 24/3427;
(Continued)

(56) References Cited

U.S. PATENT DOCUMENTS 2,552,499 A * 5/1951 Tinnerman ............ F16B 37/044
411/112
2,672,905 A * 3/1954 Hartman ............... F16B 37/041
411/175
(Continued)

FOREIGN PATENT DOCUMENTS

CN  102022640 A  4/2011
CN  102834664 A  12/2012
(Continued)

OTHER PUBLICATIONS

PCT Written Opinion of the International Searching Authority, dated May 20, 2015, 12 pages.
(Continued)

*Primary Examiner* — Bao Q Truong
*Assistant Examiner* — Fatima N Farokhrooz
(74) *Attorney, Agent, or Firm* — Barley Snyder

(57) ABSTRACT

A clamp for a socket assembly is disclosed. The clamp comprises an upper plate, a lower plate arranged parallel to the upper plate, and a pressing section connected to the upper plate. The upper plate is capable of being pressed toward the lower plate.

21 Claims, 12 Drawing Sheets

(51) Int. Cl.
*F21V 17/16* (2006.01)
*F21V 23/00* (2015.01)
*F21V 23/06* (2006.01)
*F21Y 115/10* (2016.01)

(52) U.S. Cl.
CPC ............ *F21V 23/001* (2013.01); *F21V 23/06* (2013.01); *F21Y 2115/10* (2016.08)

(58) Field of Classification Search
CPC .......... F16B 2/20; F16B 37/04; F16B 37/044; F16B 37/062; F16B 37/065; F16B 5/0635; F16B 37/041; F16B 2/065
See application file for complete search history.

(56) References Cited

U.S. PATENT DOCUMENTS

| | | | |
|---|---|---|---|
| 4,728,235 A | | 3/1988 | Patti |
| 5,695,296 A | * | 12/1997 | Miura ............... B60R 19/24 403/2 |
| 5,827,026 A | | 10/1998 | Patti |
| 5,867,959 A | * | 2/1999 | Ruble ............... E04D 3/3607 52/520 |
| 5,971,686 A | * | 10/1999 | Stewart ............. F16B 37/041 411/113 |
| 7,806,569 B2 | * | 10/2010 | Sanroma ............. A47F 3/001 362/398 |
| 8,360,606 B2 | | 1/2013 | Takei et al. |
| 8,568,001 B2 | | 10/2013 | Daily et al. |
| 2005/0180157 A1 | | 8/2005 | Watanabe et al. |
| 2007/0274086 A1 | * | 11/2007 | Takeda ............... F21V 19/001 362/507 |
| 2008/0130275 A1 | | 6/2008 | Higley et al. |
| 2011/0031864 A1 | | 2/2011 | Rebergen |
| 2011/0136394 A1 | * | 6/2011 | Mostoller ............ F21K 9/00 439/701 |
| 2013/0027948 A1 | * | 1/2013 | Gaeta ............... F21V 19/001 362/311.02 |
| 2013/0044501 A1 | * | 2/2013 | Rudisill ............ F21V 29/70 362/398 |
| 2013/0065419 A1 | | 3/2013 | Sakai |
| 2013/0286645 A1 | * | 10/2013 | Bukkems ............ F21K 9/90 362/227 |

FOREIGN PATENT DOCUMENTS

| | | |
|---|---|---|
| EP | 2295844 A2 | 3/2011 |
| EP | 2413021 A2 | 2/2012 |
| JP | H11-099877 A | 4/1999 |
| JP | 2012-23078 A | 2/2012 |
| JP | 2013-62148 A | 4/2013 |
| WO | 2011015168 A1 | 2/2011 |
| WO | 2011124974 A1 | 10/2011 |

OTHER PUBLICATIONS

European Search Report, dated Sep. 23, 2014, 9 pages.
Chinese First Office Action, English translation, dated Jul. 2, 2018, 9 pages.
Japanese Notice of Reasons for Refusal with English translation, dated Sep. 18, 2018, 9 pages.
Abstract of JP H11-099877A, dated Apr. 13, 1999, 1 page.
Abstract of JP 2012-23078A, dated Feb. 2, 2012, 1 page.

* cited by examiner

SOCKET ASSEMBLY AND CLAMP FOR A SOCKET ASSEMBLY

CROSS-REFERENCE TO RELATED APPLICATIONS

This application is a continuation of PCT International Application No. PCT/EP2015/055108, filed on Mar. 11, 2015, which claims priority under 35 U.S.C. § 119 to European Patent Application No. 14159152.9, filed on Mar. 12, 2014.

FIELD OF THE INVENTION

The present invention relates to a clamp, and more particularly, to a clamp for a socket assembly.

BACKGROUND

Socket assemblies for housing optoelectronic packages, such as a package comprising a light emitting diode (LED), are known in the art. An exemplary socket assembly is described in U.S. Pat. No. 8,568,001. Optoelectronic packages are typically provided as chip-on-board packages that comprise an optoelectronic semiconductor chip arranged on a printed circuit board. Socket assemblies for housing such packages typically provide means for holding the package, mounting the package on a carrier, electrically connecting the package, and for cooling the package.

Cooling the package can be achieved by pressing the package against a heat sink. In known socket assemblies, however, a pressure force exerted on the package can deteriorate over the age of the socket assembly and may be dependent on temperature differences. The decrease in pressure force can adversely affect cooling, impairing performance of the socket assembly.

SUMMARY

An object of the invention, among others, is to provide a clamp for applying a constant pressure force on an optoelectronic package of a socket assembly independent of aging and temperature differences. The disclosed clamp comprises an upper plate, a lower plate arranged parallel to the upper plate, and a pressing section connected to the upper plate. The upper plate is capable of being pressed toward the lower plate.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a socket assembly. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 6:
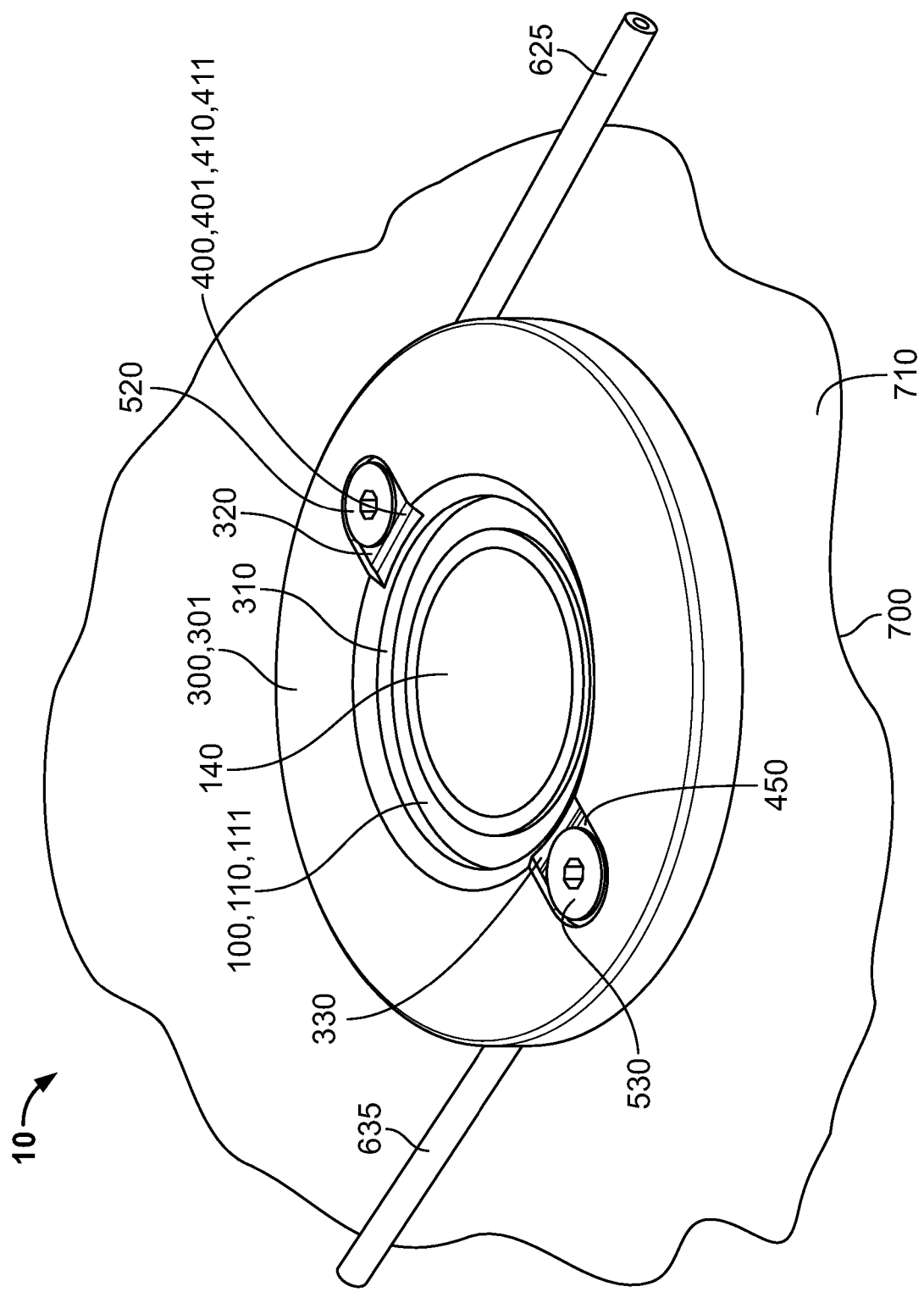
FIG. 6 is a perspective view of the socket assembly of FIG. 2 in an assembled state.
Figure 7:
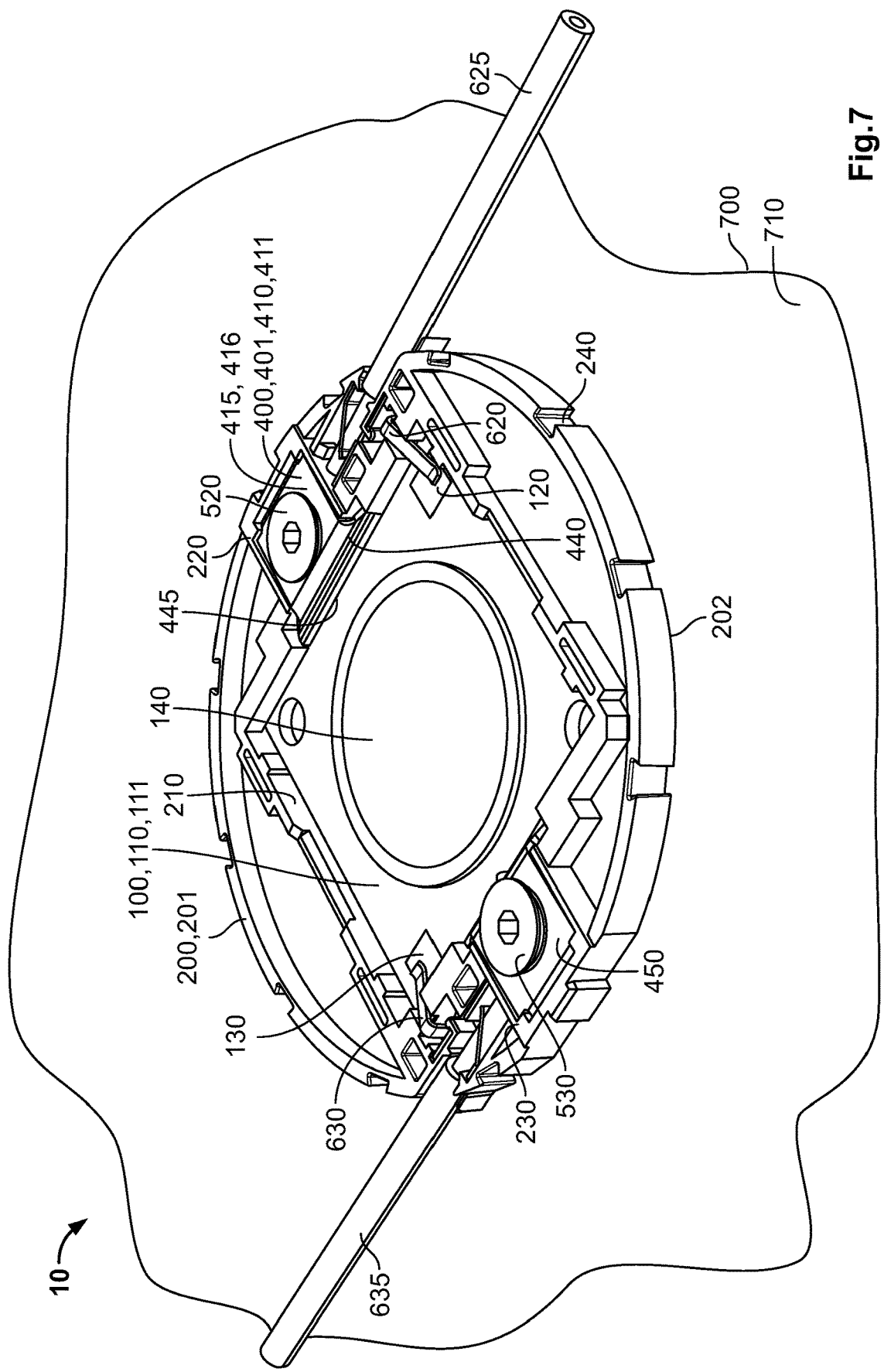
FIG. 7 is a perspective view of the socket assembly of FIG. 2 with the cover removed.
Figure 8:
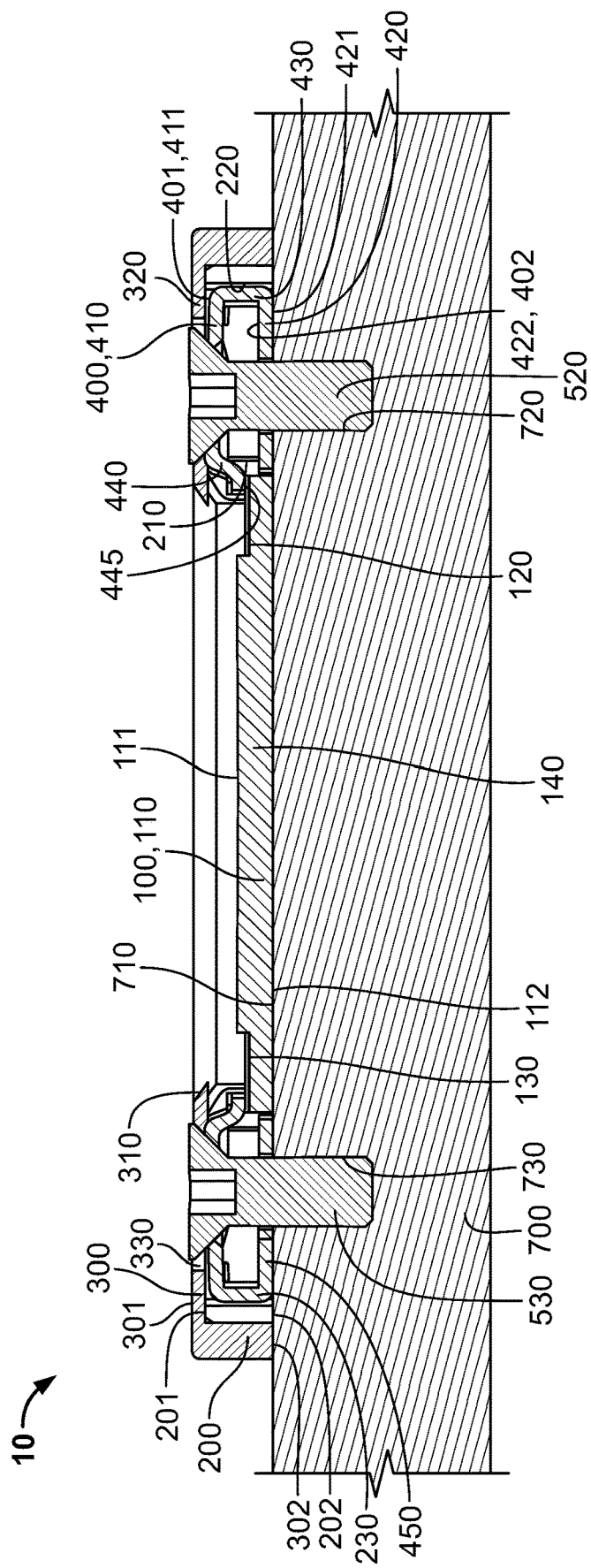
FIG. 8 is a sectional view of the socket assembly of FIG. 2.

A socket assembly 10 according to the invention is shown generally in FIGS. 6-8. The socket assembly 10 has a frame 200, a cover 300, and a first clamp 400. The major components of the invention will now be described in greater detail.

Figure 2:
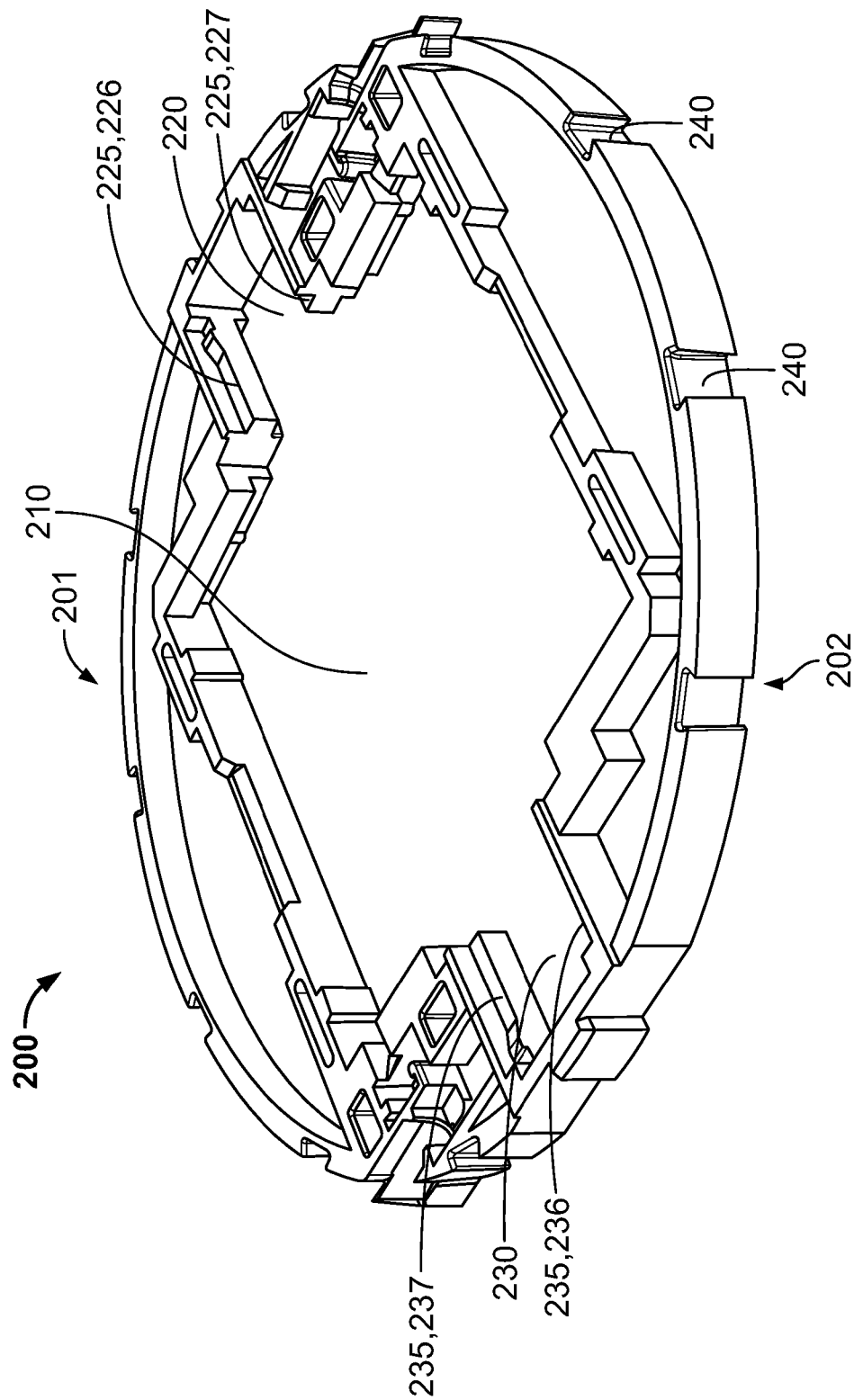
FIG. 2 is a perspective view of a frame of a socket assembly according to the invention.

The frame 200 is shown in FIG. 2. The frame 200 is formed of an electrically insulating material, such as plastic. The frame 200 may be produced by molding.

The frame 200 has a generally flat shape with an upper side 201 and a lower side 202 that is opposed to the upper side 201. In the embodiment shown in FIG. 2, the frame 200 has a circular shape, however, it is possible to design the frame 200 with any other shape, for example with a rectangular shape.

The frame 200 has a central opening 210 that is arranged approximately in the center of the frame 200. The central opening 210 forms an opening between the upper side 201 and the lower side 202 of the frame 200. The central opening 210 is substantially the same shape and size as the LED package 100, such that the LED package 100 can be arranged in the central opening 210 of the frame 200. Consequently, in the embodiment shown in FIG. 2, the central opening 210 has a rectangular shape.

The frame 200 has a first side opening 220 and a second side opening 230. The first side opening 220 and the second side opening 230 form openings between the upper side 201 and the lower side 202 of the frame 200. The first side opening 220 and the second side opening 230 are arranged directly adjacent to the central opening 210, such that the central opening 210, the first side opening 220 and the second side opening 230 are connected. The first side opening 220 and the second side opening 230 are arranged at opposite sides of the central opening 210.

In the area of the first side opening 220, the frame 200 has a first anchoring section 225. The first anchoring section 225 has a first bar 226 and a second bar 227 that are arranged parallel to each other on two opposing sides of the first side opening 220. In the area of the second side opening 230, the frame 200 comprises a second anchoring section 235. The second anchoring section 235 comprises a first bar 236 and a second bar 237. The first bar 236 and the second bar 237 are arranged in parallel to each other on two opposing sides of the second side opening 230.

The frame 200 also has a plurality of grooves 240 arranged at an outer circumference of the frame 200.

Figure 3:
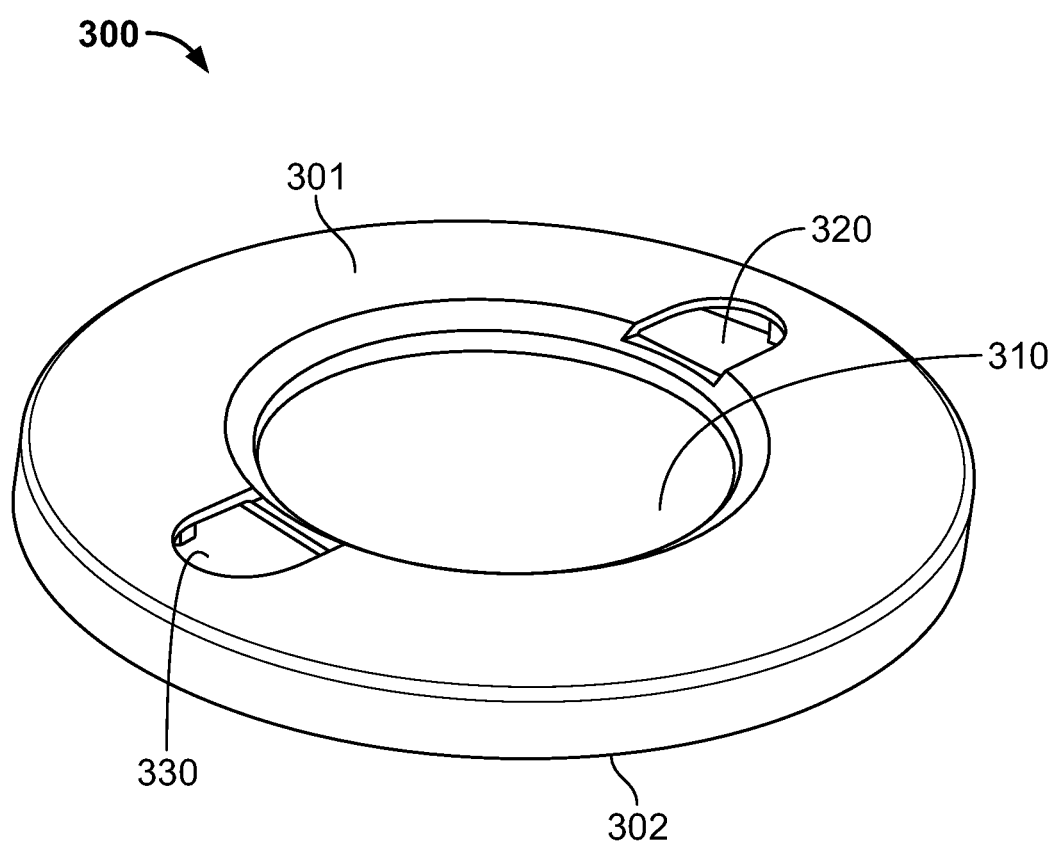
FIG. 3 is a perspective view of a cover of the socket assembly of FIG. 2.

The cover 300 is shown in FIG. 3. The cover 300 is formed of an electrically insulating material, such as plastic. The cover 300 may be produced by molding.

The cover 300 has a generally flat shape with an upper side 301 and a lower side 302 that is opposed to the upper side 301. The cover 300 has a circular shape that matches the shape of the frame 200. On the lower side 302 of the cover 300, the cover 300 has a plurality of tongues (not shown).

The cover 300 has a central opening 310 which is arranged approximately in the center of the cover 300. The central opening 310 forms an opening between the upper side 301 and the lower side 302 of the cover 300. The diameter of the central opening 310 may be slightly larger than the diameter of the arrangement of sealing compound 140 on the upper side 111 of the circuit board 110 of the LED package 100.

The cover 300 has a first opening 320 and a second opening 330. The first opening 320 and the second opening 330 form openings between the upper side 301 and the lower side 302 of the cover 300. The first opening 320 and the second opening 330 are arranged at opposed sides of the central opening 310.

Figure 4:
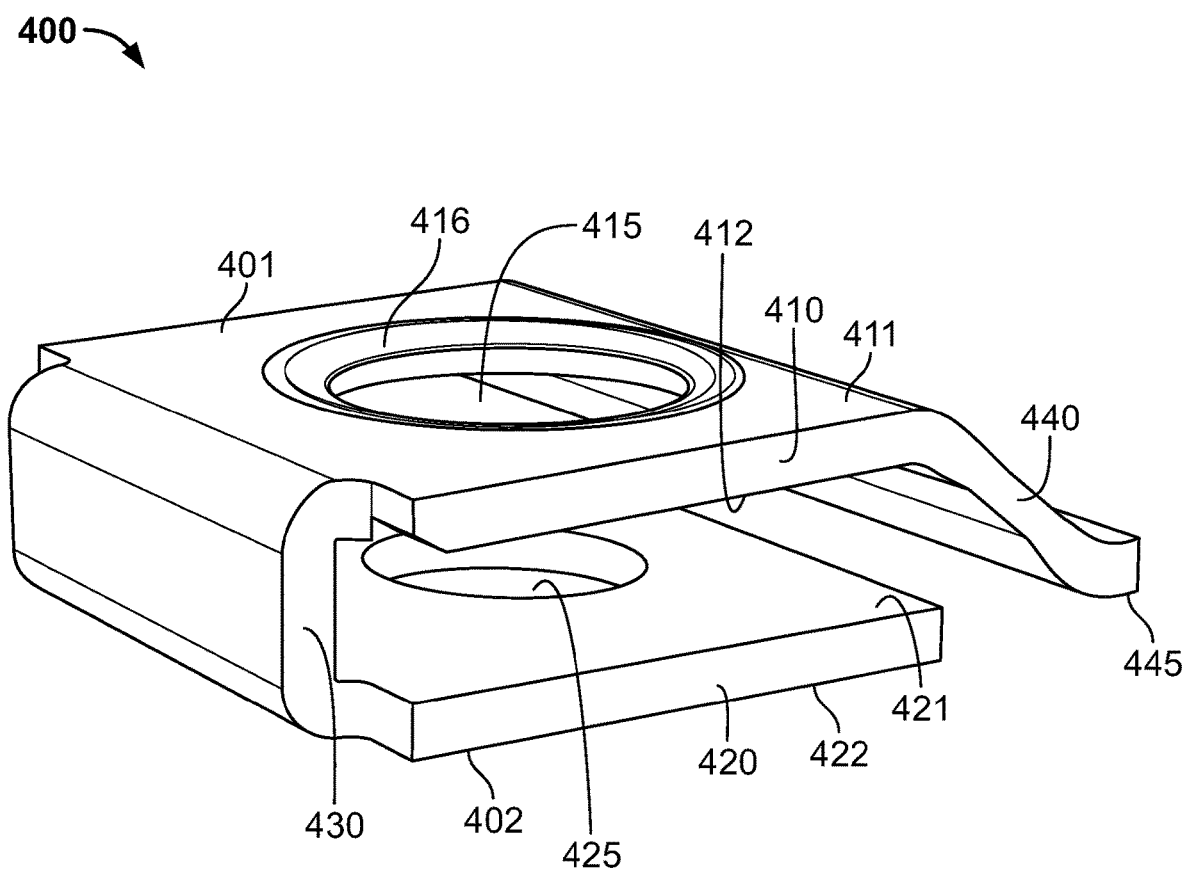
FIG. 4 is a perspective view of a first clamp of the socket assembly of FIG. 2.
Figure 5:
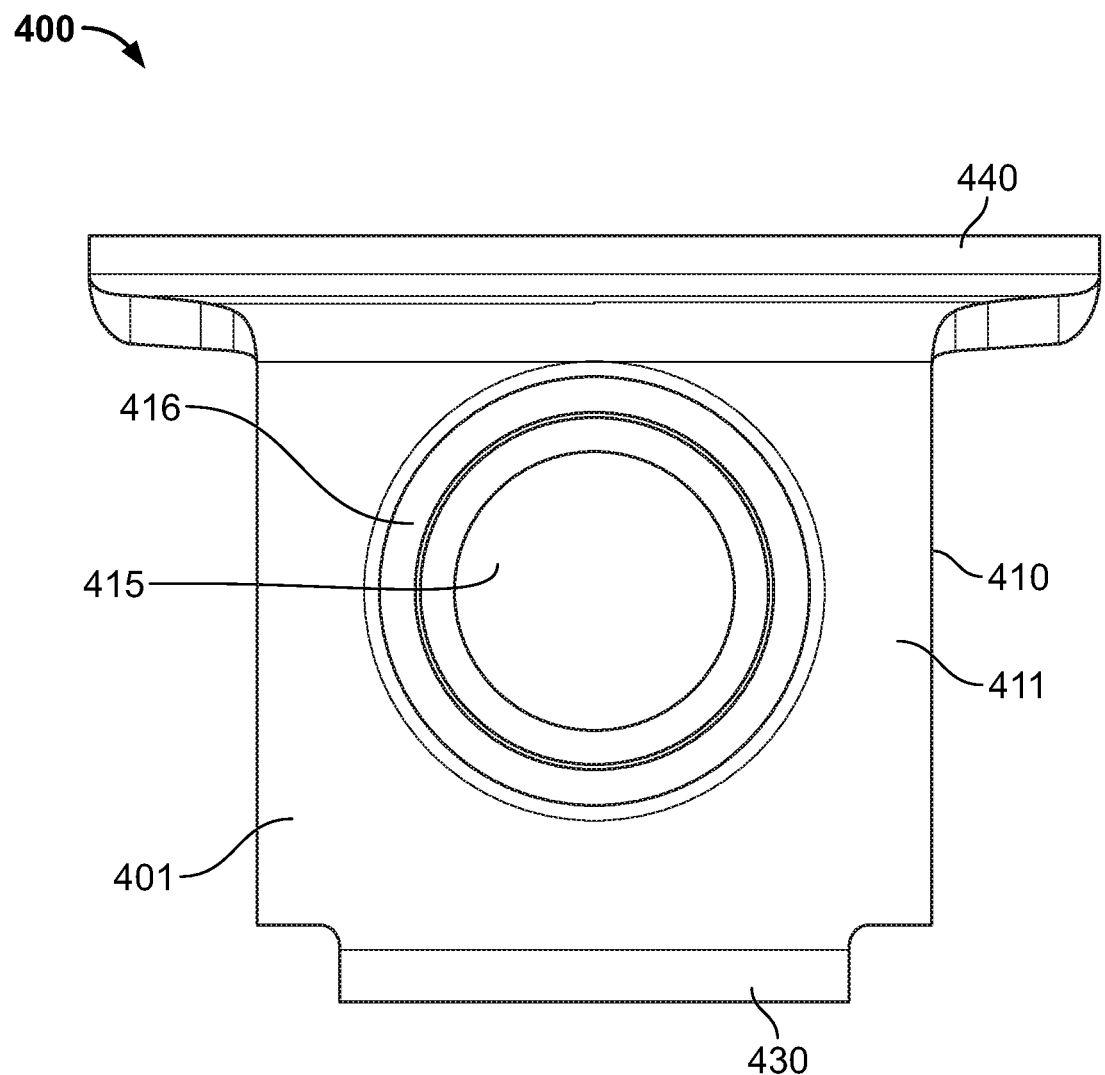
FIG. 5 is a top view of the first clamp of FIG. 4.

The first clamp 400 is shown in FIGS. 4 and 5. The first clamp 400 is formed of an elastically deformable metal. The first clamp 400 may be fabricated from a sheet metal plate by stamping and bending.

The first clamp 400 has an upper plate 410 and a lower plate 420. The upper plate 410 and the lower plate 420 each have a generally rectangular shape. The upper plate 410 and the lower plate 420 are arranged in parallel to each other and above each other. The upper plate 410 has an upper side 411 and a lower side 412 that is opposed to the upper side 411. The lower plate 420 has an upper side 421 and a lower side 422 that is opposed to the upper side 421. The lower side 412 of the upper plate 410 faces the upper side 421 of the lower plate 420. The upper side 411 of the upper plate 410 forms an upper side 401 of the first clamp 400. The lower side 422 of the lower plate 420 forms a lower side 402 of the first clamp 400.

The upper plate 410 and the lower plate 420 of the first clamp 400 are connected by a connecting section 430. The connecting section 430 generally extends in a direction perpendicular to the upper plate 410 and the lower plate 420. The connecting section 430 is integrally connected to the upper plate 410 and the lower plate 420.

The first clamp 400 has a pressing section 440. The pressing section 440 is integrally connected to the upper plate 410 of the first clamp 400. The pressing section 440 is arranged at an end of the upper plate 410 that is opposed to the connecting section 430. The pressing section 440 is inclined with respect to the plane of the upper plate 410 and extends towards the lower plate 420 of the first clamp 400 and away from the connecting section 430.

At an end that is opposed to the upper plate 410, the pressing section 440 has a contact area 445. In a direction perpendicular to the upper plate 410 and the lower plate 420, the contact area 445 is arranged between the lower plate 420 and the upper plate 410. The contact area 445 is oriented in the same direction as the lower side 412 of the upper plate 410 and the lower side 422 of the lower plate 420.

The upper plate 410 of the first clamp 400 has an upper passageway 415. The upper passageway 415 extends through the upper plate 410, forming an opening between the upper side 411 and the lower side 412 of the upper plate 410. The upper passageway 415 is arranged approximately in the center of the upper plate 410 of the first clamp 400. The lower plate 420 has a lower passageway 425. The lower passageway 425 extends through the lower plate 420, forming an opening between the upper side 421 and the lower side 422 of the lower plate 420. The lower passageway 425 is arranged at approximately the center of the lower plate 420 and is arranged coaxially to the upper passageway 415 of the upper plate 410. In the embodiment shown in FIG. 4, the lower passageway 425 comprises a slightly smaller diameter than the upper passageway 415. It is, however, possible to design the upper passageway 415 and the lower passageway 425 with the same diameters, or to design the lower passageway 425 with a larger diameter than the upper passageway 415. The upper passageway 415 has a chamfer 416 at the upper side 411 of the upper plate 410. The chamfer 416, however, can be omitted.

The first clamp 400 is elastically deformable such that the upper plate 410 can be pressed towards the lower plate 420 of the first clamp 400. When the upper plate 410 is pressed towards the lower plate 420, the connecting section 430 of the first clamp 400 is elastically deformed. When the upper plate 410 is pressed towards the lower plate 420, the upper plate 410 and the lower plate 420 are no longer arranged in parallel to each other, but are slightly inclined to each other. When the upper plate 410 is pressed towards the lower plate 420, the contact area 445 of the pressing section 440 of the first clamp 400 moves downwards in the direction in which the lower side 422 of the lower plate 420 points.

The socket assembly 10 serves for holding and mounting an LED package 100. The socket assembly 10 further provides electric connections to the LED package 100.

Figure 1:
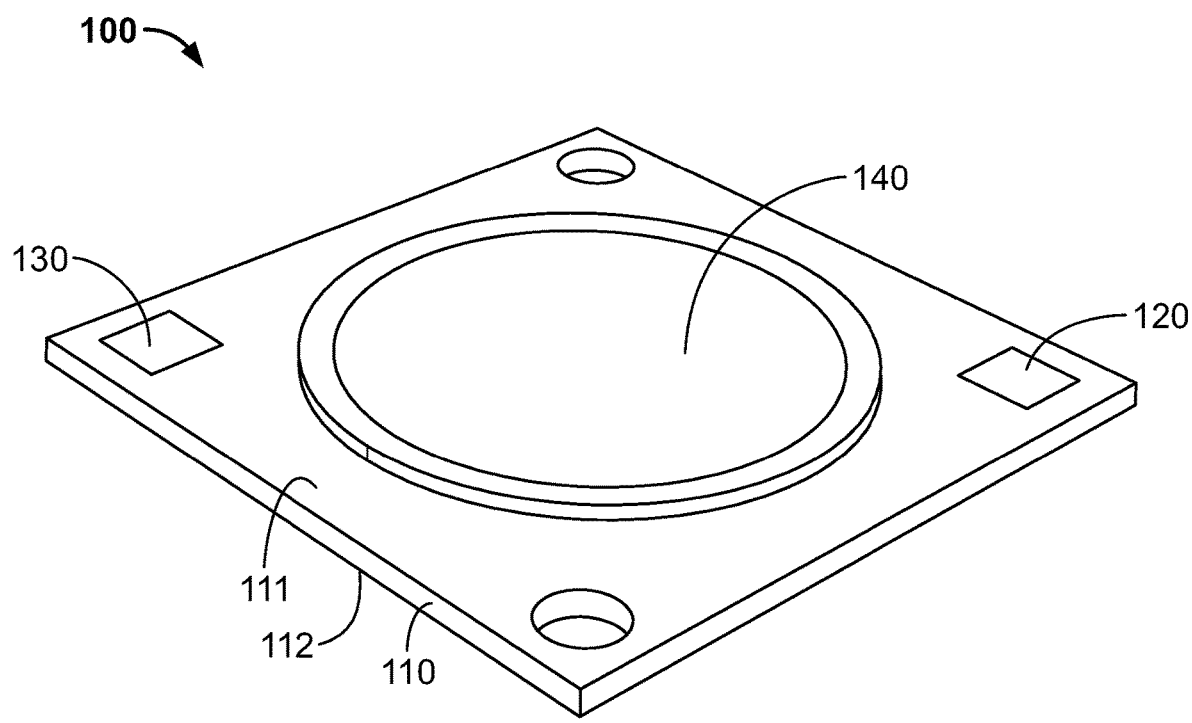
FIG. 1 is a perspective view of an LED package.

The LED package 100 is shown in FIG. 1. The LED package 100 may be designed as a chip-on-board package, however, the LED package 100 shown is an example only and can be replaced by any other optoelectronic package known to those with ordinary skill in the art.

The LED package 100 comprises a circuit board 110. The circuit board 110 may for example be a printed circuit board. The circuit board 110 has an upper side 111 and a lower side 112 that is opposed to the upper side 111. In the embodiment shown in FIG. 1, the circuit board 110 has a rectangular shape, however, it is possible to design the circuit board 110 with any other shape, for example with a circular shape.

A light emitting diode (LED) chip (not shown) is arranged on the upper side 111 of the circuit board 110. The LED chip is encapsulated in a sealing compound 140 and thus not visible in the depiction of FIG. 1. The LED chip is designed for emitting electromagnetic radiation, for example visible light. The sealing compound 140 is arranged in a circular disc shape in the embodiment shown FIG. 1, but may alternatively be arranged in any other shape. The sealing compound 140 may for example comprise silicone and serves to protect the LED chip. The sealing compound 140 can further comprise particles that serve to convert a wavelength of electromagnetic radiation emitted by the LED chip.

A first contact pad 120 and a second contact pad 130 are arranged on the upper side 111 of the circuit board 110 of the LED package 100. The first contact pad 120 and the second contact pad 130 are provided for electrically contacting the LED chip of the LED package 100. The first contact pad 120 and the second contact pad 130 are connected to the LED chip by electrically conductive circuit paths which are not visible in FIG. 1. The circuit paths can be arranged on the upper side 111 of the circuit board 110, the lower side 112 of the circuit board 110, or inside the circuit board 110.

The socket assembly 10, as shown in FIGS. 6-8, is arranged on a surface 710 of a carrier 700. The carrier 700 may for example be a heat sink. The socket assembly 10 serves to ensure a good thermal contact between the LED package 100 and the carrier 700 in order to remove heat generated in the LED package 100 from the LED package 100.

The frame 200 of the socket assembly 10 is disposed on the surface 710 of the carrier 700 such that the lower side 202 of the frame 200 faces the surface 710 of the carrier 700 and is in contact with the surface 710 of the carrier 700. The LED package 100 is disposed in the central opening 210 of the frame 200 such that the lower side 112 of the circuit board 110 faces the surface 710 of the carrier 700 and is in contact with the surface 710 of the carrier 700.

The cover 300 is connected to the frame 200 of the socket assembly 10 and arranged above the LED package 100 such that light emitted by the LED chip on the upper side 111 of the circuit board 110 can be radiated through the central opening 310 of the cover 300. The cover 300 can be connected to the frame 200 by sliding the tongues of the cover 300 into the grooves 240 of the frame 200. When the cover 300 is arranged on the frame 200, the first opening 320 of the cover 300 is arranged above the first side opening 220 of the frame 200 and the second opening 330 of the cover 300 is arranged above the second side opening 230 of the frame 200.

The first clamp 400 is disposed in the first side opening 220 of the frame 200. The pressing section 440 of the first clamp 400 is oriented towards the central opening 210 of the frame 200. The contact area 445 of the pressing section 440 is disposed above the upper side 111 of the circuit board 110 disposed in the central opening 210 of the frame 200. The first bar 226 and the second bar 227 of the first anchoring section 225 are arranged between the upper plate 410 and the lower plate 420 of the first clamp 400.

A second clamp 450 is arranged in the second side opening 230 of the frame 200. The second clamp 450 is designed like the first clamp 400 and is arranged in the second side opening 230 of the frame 200 in a manner analogous to the arrangement of the first clamp 400.

The carrier 700 has a first threaded hole 720 and a second threaded hole 730. The first threaded hole 720 and the second threaded hole 730 extend from the surface 710 of the carrier 700 into the carrier 700. A first screw 520 extends through the upper passageway 415 of the upper plate 410 of the first clamp 400 and the lower passageway 425 of the lower plate 420 of the first clamp 400 into the first threaded hole 720 of the carrier 700. A second screw 530 extends in an analogous manner through the second clamp 450 into the second threaded hole 730 of the carrier 700. The first screw 520 and the second screw 530 fix the socket assembly 10 on the surface 710 of the carrier 700.

The screw head of the first screw 520 comprises a diameter that is larger than the diameter of the upper passageway 415 in the upper plate 410 of the first clamp 400. The screw head of the first screw 520 is partially sunk in the chamfer 416 of the upper passageway 415 in the upper plate 410 of the first clamp 400.

Screwing the first screw 520 into the first threaded hole 720 presses the upper plate 410 of the first clamp 400 towards the surface 710 of the carrier 700 and thus towards the lower plate 420 of the first clamp 400. Pressing the upper plate 410 of the first clamp 400 towards the lower plate 420 of the first clamp 400 clamps the first bar 226 and the second bar 227 of the first anchoring section 225 between the lower side 412 of the upper plate 410 and the upper side 421 of the lower plate 420 and thus fixes the frame 200 with respect to the first clamp 400 and the carrier 700.

At the same time, pressing the upper plate 410 of the first clamp 400 towards the lower plate 420 of the first clamp 400 presses the contact area 445 against the upper side 111 of the circuit board 110, and thus presses the circuit board 110 against the surface 710 of the carrier 700.

Screwing the second screw 530 into the second threaded hole 730 analogously clamps the first bar 236 and the second bar 237 of the second anchoring section 235 of the frame 200 between the upper plate and the lower plate of the second clamp 450, and analogously presses the pressing section of the second clamp 450 against the upper side 111 of the circuit board 110 of the LED package 100 to press the circuit board 110 of the LED package 100 against the surface 710 of the carrier 700.

The pressure force exerted by the contact area 445 of the pressing section 440 of the first clamp 400 on the upper side 111 of the circuit board 110 of the LED package 100 can be adjusted by adjusting how deep the first screw 520 is screwed into the first threaded hole 720 of the carrier 700. There is a monotonic relation between the screw torque of the first screw 520 and the pressure force exerted on the circuit board 110 of the LED package 100 by the first clamp 400. This monotonic relation can be used to precisely adjust the desired pressure exerted on the circuit board 110 of the LED package 100. The same holds for the second screw 530.

A first contact spring 620 and a second contact spring 630 are arranged in the frame 200 of the socket assembly 10. The first contact spring 620 and the second contact spring 630 comprise an electrically conductive material, preferably a metal. The first contact spring 620 is in electric contact with the first contact pad 120 arranged on the upper side 111 of the circuit board 110 of the LED package 100. The second contact spring 630 is in electric contact with the second contact pad 130 arranged on the upper side 111 of the circuit board 110 of the LED package 100. The electric contacts between the contact springs 620, 630 and the contact pads 120, 130 are provided by elastic spring elements of the contact springs 620, 630.

A first wire 625 is connected to the frame 200 of the socket assembly 10 such that the first wire 625 is electrically connected to the first contact spring 620 and thus also to the first contact pad 120 of the LED package 100. A second wire 635 is connected to the frame of the socket assembly 10 such that the second wire 635 is electrically connected to the second contact spring 630 and thus also to the second contact pad 130 of the LED package 100.

Figure 9:
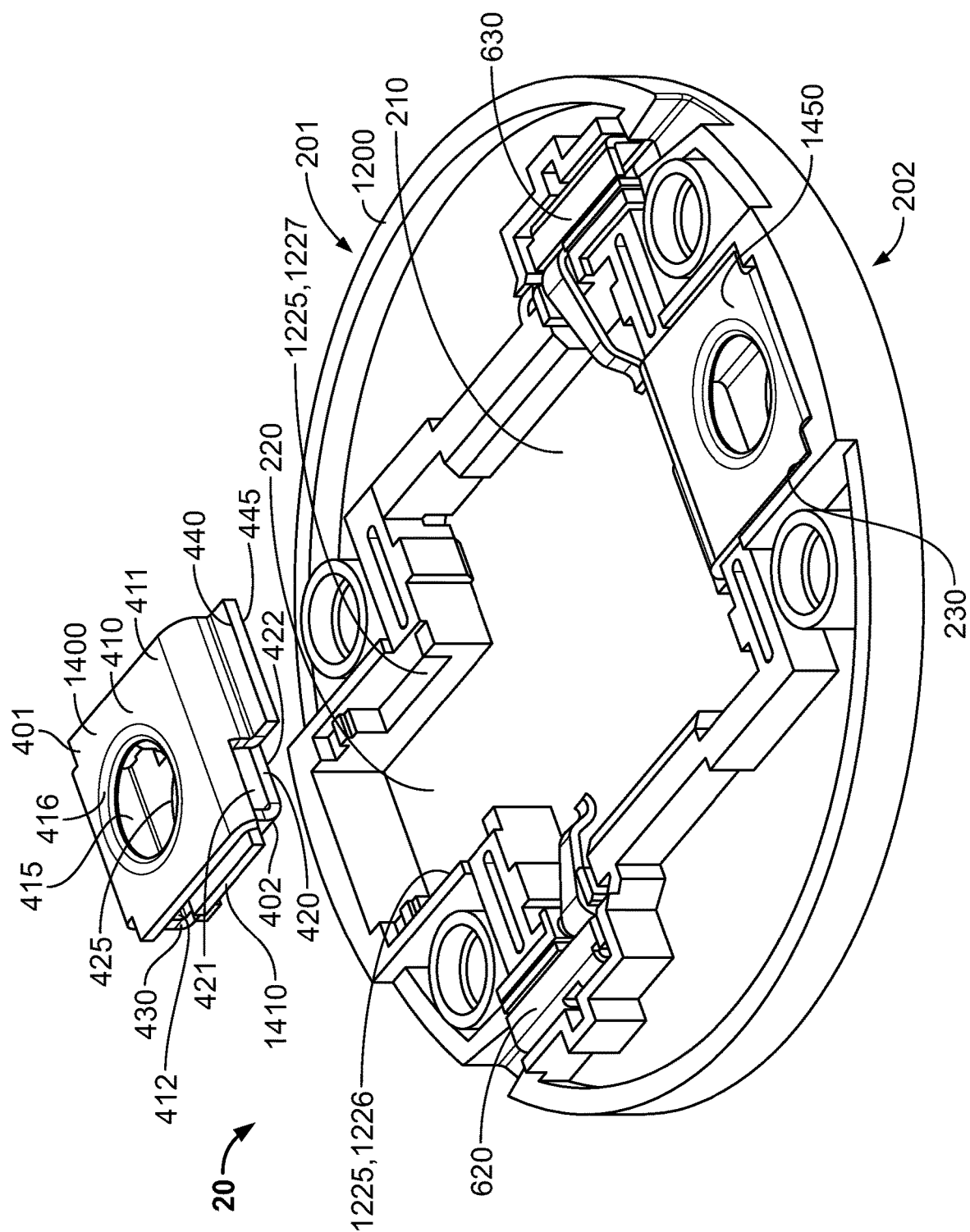
FIG. 9 is a perspective view of a frame of another socket assembly according to the invention.
Figure 12:
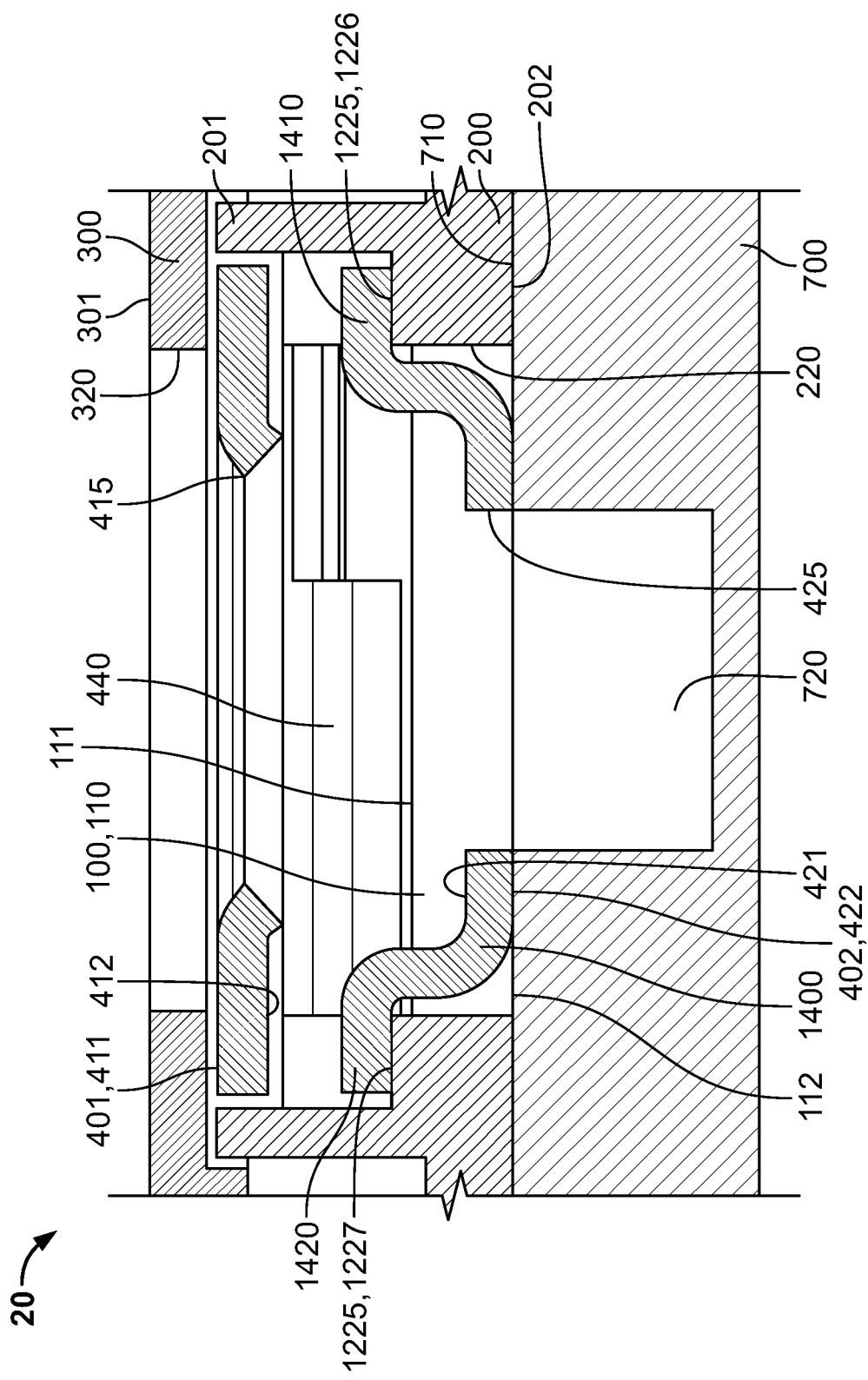
FIG. 12 is a sectional view of the socket assembly of FIG. 9.

A socket assembly 20 according to another embodiment of the invention is shown in FIGS. 9 and 12. The socket assembly 20 is largely similar to the socket assembly 10 which was described above with reference to FIGS. 1-8. Like components of the socket assembly 10 and the socket assembly 20 are denoted with the same numerals in FIG. 9 as in FIGS. 1 to 8 and will not be explained in detail again. The following description will focus on the differences between the socket assembly 10 and the socket assembly 20; the description of the socket assembly 10 applies accordingly to the socket assembly 20, unless stated otherwise.

The socket assembly 20 has a frame 1200 that replaces the frame 200 of the socket assembly 10. The frame 1200 has a central opening 210, a first side opening 220 and a second side opening 230, just like the frame 200.

In the first side opening 220, the frame 1200 comprises a first anchoring section 1225. The first anchoring section 1225 comprises a first bar 1226 and a second bar 1227. The first bar 1226 and the second bar 1227 are arranged parallel to each other on two opposing sides of the first side opening 220. The lower sides of the first bar 1226 and the second bar 1227 are flush with the lower side 202 of the frame 1200. In the area of the second side opening 230, the frame 1200 comprises a second anchoring section which is designed like the first anchoring section 1225.

Figure 10:
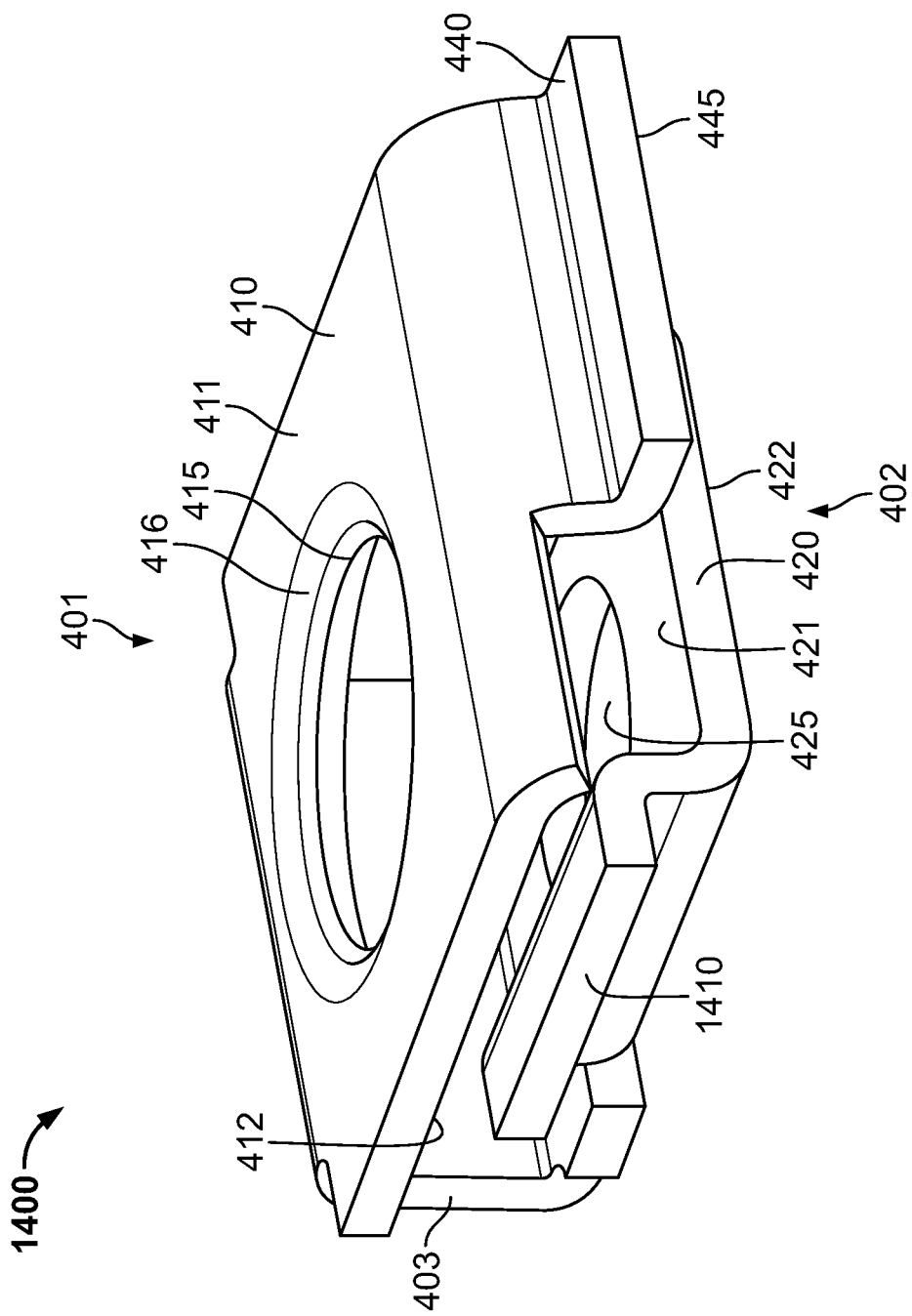
FIG. 10 is a perspective view of a first clamp of the socket assembly of FIG. 9.
Figure 11:
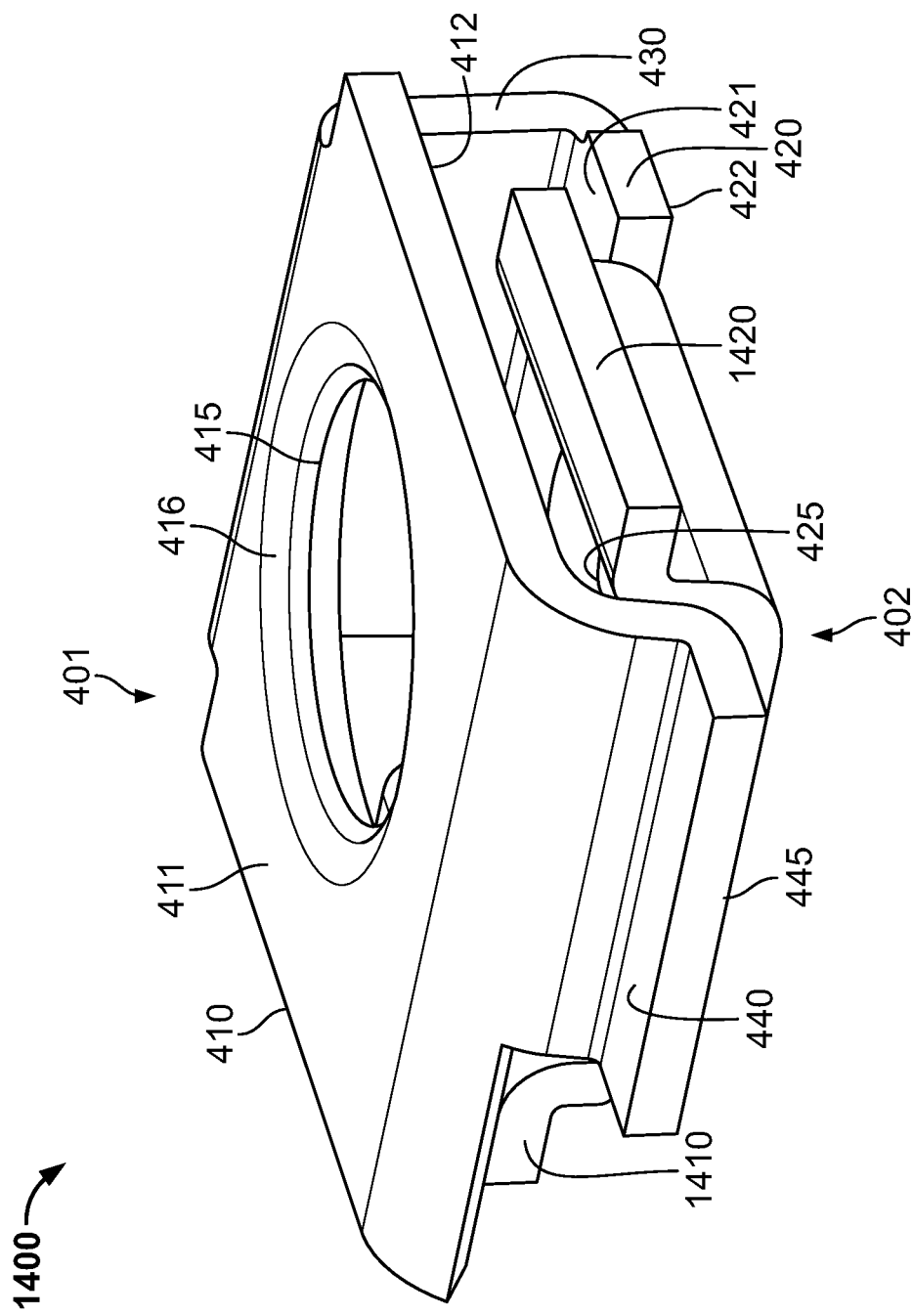
FIG. 11 is a perspective view of a first clamp of the socket assembly of FIG. 9.

The socket assembly 20 has a first clamp 1400, shown in FIGS. 10 and 11, and a second clamp 1450 designed like the first clamp 1400. In contrast to the first clamp 400, the lower plate 420 of the first clamp 1400 comprises a first wing section 1410 and a second wing section 1420 that is opposed to the first wing section 1410. The first wing section 1410 and the second wing section 1420 extend in parallel to each other in a direction from the connecting section 430 of the first clamp 1400 towards the pressing section 440 of the first clamp 1400. The first wing section 1410 and the second wing section 1420 each extend from the lower side 402 of the first clamp 1400 partially towards the upper plate 410 and the upper side 401 of the first clamp 1400.

The first clamp 1400 of the socket assembly 20 can be arranged in the first side opening 220 of the frame 1200. The second clamp 1450 of the socket assembly 20 can be arranged in the second side opening 230 of the frame 1200.

As shown in FIG. 12, the first bar 1226 of the first anchoring section 1225 is arranged below the first wing section 1410 of the first clamp 1400 such that the lower side 422 of the first wing section 1410 faces the first bar 1226. The second bar 1227 of the first anchoring section 1225 is accordingly arranged below the second wing section 1420 of the first clamp 1400 such that the lower side 422 of the second wing section 1420 is oriented towards the second bar 1227 of the first anchoring section 1225. The first wing section 1410 and the second wing section 1420 press the lower side 202 of the frame 1200 of the socket assembly 20 against the surface 710 of the carrier 700.

Advantageously, in the socket assembly 20 according to the invention, the first clamp 400 and the second clamp 450 press the circuit board 110 of the LED package 100 against the surface 710 of the carrier 700, which provides a good thermal connection between the circuit board 110 and the carrier 700 and helps to remove heat from the circuit board 110. The clamps 400 and 450 are further mechanically robust and resistant to deleterious effects of aging, allowing the circuit board 110 arranged in the frame 200 to show a predictable behavior over temperature and lifetime.

What is claimed is:
1. A clamp for a socket assembly, comprising:
an upper plate;
a lower plate arranged parallel to the upper plate, the upper plate capable of being pressed toward the lower plate, the lower plate having a wing section extending from the lower plate toward the upper plate, a portion of the wing section is parallel to a plane defined by the upper plate or the lower plate;
a pressing section connected to the upper plate, the pressing section extends at an incline from the upper plate and has a contact area at an end of the pressing section opposite the upper plate, the contact area extends parallel to the upper plate;
a connecting section opposed to the pressing section and extending between the upper plate and the lower plate, the connecting section having a length less than a length of the upper plate and the lower plate in a longitudinal direction of the connecting section parallel to the plane defined by the upper plate or the lower plate, the connecting section extends from a first side of the lower plate and the wing section extends from a second side of the lower plate, the first side is perpendicular to the second side.

2. The clamp of claim 1, wherein an upper passageway extends through the upper plate and a lower passageway extends through the lower plate.

3. The clamp of claim 1, wherein the pressing section extends from the upper plate at least partially towards the lower plate.

4. The clamp of claim 1, wherein the clamp is formed of a metal material.

5. The clamp of claim 1, wherein the clamp is elastically deformable.

6. The clamp of claim 1, wherein the lower plate is entirely planar.

7. The clamp of claim 2, wherein the upper passageway is arranged coaxially with the lower passageway.

8. The clamp of claim 7, wherein the upper passageway has a chamfer at an upper side of the upper plate that faces away from the lower plate.

9. A socket assembly, comprising:
a carrier formed as a heat sink;
a frame disposed on the carrier and having a central opening receiving a circuit board; and
a first clamp having an upper plate, a lower plate arranged parallel to the upper plate and abutting the carrier, a pressing section connected to the upper plate, and a connecting section connecting the upper plate and the lower plate, the lower plate having a wing section extending perpendicular to the connecting section, the upper plate and lower plate capable of being pressed together such that the frame is clamped between the upper plate and the lower plate and the pressing section abuts the circuit board and presses the circuit board against the carrier, the frame and the first clamp are arranged entirely on a single surface of the carrier.

10. The socket assembly of claim 9, wherein the lower plate has a wing section extending from the lower plate toward the upper plate.

11. The socket assembly of claim 9, wherein the frame has an anchoring section arranged between the upper plate and the lower plate.

12. The socket assembly of claim 9, further comprising a second clamp identical to the first clamp.

13. The socket assembly of claim 9, wherein the circuit board is a printed circuit board of an LED package.

14. The socket assembly of claim 9, further comprising a cover arranged on the frame.

15. The socket assembly of claim 9, further comprising a contact spring arranged on the frame.

16. The socket assembly of claim 9, further comprising a screw extending through the upper plate and the lower plate of the first clamp and engaging a threaded hole of the carrier, a tightening of the screw pressing the upper plate and the lower plate together.

17. The socket assembly of claim 10, wherein the frame has an anchoring section arranged below the wing section.

18. The socket assembly of claim 11, wherein the upper plate and the lower plate are capable of being pressed together such that the anchoring section is clamped between the upper plate and the lower plate.

19. The socket assembly of claim 15, wherein the contact spring is connected to a wire and a contact pad of the circuit board.

20. The socket assembly of claim 16, wherein the tightening of the screw is monotonically related to a pressure applied by the pressing section on the circuit board.

21. The socket assembly of claim 16, wherein the screw does not directly abut the frame and the frame is held only by clamping between the upper plate and the lower plate.

\* \* \* \* \*